(12) United States Patent
Schmidt et al.

(10) Patent No.: US 8,948,801 B2
(45) Date of Patent: Feb. 3, 2015

(54) SYSTEMS AND METHODS FOR PROVISIONING AND ALLOCATING A COMMODITIZED SPECTRUM OBJECT

(75) Inventors: Jeffrey C. Schmidt, Orlando, FL (US); Thomas C. Evans, Lakeland, FL (US); Hrishikesh Gossain, Santa Barbara, CA (US); Manish Shukla, Altamonte Springs, FL (US)

(73) Assignee: Spectrum Bridge, Inc., Lake Mary, FL (US)

( * ) Notice: Subject to any disclaimer, the term of this patent is extended or adjusted under 35 U.S.C. 154(b) by 269 days.

(21) Appl. No.: 13/549,761

(22) Filed: Jul. 16, 2012

(65) Prior Publication Data

US 2013/0035124 A1    Feb. 7, 2013

Related U.S. Application Data

(60) Provisional application No. 61/514,595, filed on Aug. 3, 2011, provisional application No. 61/514,597, filed on Aug. 3, 2011.

(51) Int. Cl.
*H04B 7/00* (2006.01)
*H04W 28/16* (2009.01)

(52) U.S. Cl.
CPC .................................... *H04W 28/16* (2013.01)
USPC ............ 455/509; 455/501; 455/513; 455/450

(58) Field of Classification Search
CPC ..... H04W 28/16; H04W 28/00; H04W 28/02; H04W 16/00; H04W 16/02; H04W 16/04; H04W 16/10; H04W 16/14; H04W 16/18
USPC ........... 455/501, 454, 67.11, 434, 450, 452.1, 455/446, 456.3, 411, 414.1, 509, 512, 63.1, 455/62; 705/37, 1, 7; 370/329, 330, 328, 370/338, 352, 313, 331, 319, 252; 713/156
See application file for complete search history.

(56) References Cited

U.S. PATENT DOCUMENTS 5,548,809 A    8/1996 Lemson
5,608,727 A    3/1997 Perreault et al.
(Continued)

OTHER PUBLICATIONS

Kwerel, Evan et al., "A Proposal for a Rapid Transition to Market Allocation of Spectrum", Federal Communications Commission, 2002, OPP Working Paper No. 38, pp. 1-50.
(Continued)

*Primary Examiner* — Tan Trinh
(74) *Attorney, Agent, or Firm* — Tucker Ellis, LLP

(57) ABSTRACT

A provisioning engine provisions spectrum into an allocable spectrum object. The provisioning engine includes an interface configured to receive inputs of available spectrum information and a plurality of provisioning parameters. The plurality of provisioning parameters include at least one signal strength limit, and may include at least first and second signal strength limits that may be boundary strength limit and an allocation strength limit. A controller is configured to execute a spectrum provisioning application that is stored in a memory and, by execution of the spectrum provisioning application, the provisioning engine is configured to generate an allocable spectrum object in accordance with the provisioning parameters. Spectrum encompassed within the spectrum object is allocable by an allocation engine to spectrum users in accordance with the provisioning parameters. An allocation engine in turn allocates spectrum encompassed within the provisioned spectrum object in accordance with the provisioning parameters.

31 Claims, 8 Drawing Sheets

(56) References Cited

U.S. PATENT DOCUMENTS

| | | | |
|---|---|---|---|
| 6,954,171 B2 | 10/2005 | Husted et al. | |
| 7,088,997 B1 | 8/2006 | Boehmke | |
| 7,110,756 B2 | 9/2006 | Diener | |
| 7,349,880 B1 | 3/2008 | Kitao | |
| 7,460,837 B2 | 12/2008 | Diener | |
| 2003/0032399 A1 | 2/2003 | Slupe | |
| 2004/0028003 A1 | 2/2004 | Diener et al. | |
| 2004/0087310 A1* | 5/2004 | Williamson et al. | 455/450 |
| 2005/0073982 A1* | 4/2005 | Corneille et al. | 370/338 |
| 2005/0075115 A1* | 4/2005 | Corneille et al. | 455/456.3 |
| 2005/0128971 A1 | 6/2005 | Huschke et al. | |
| 2006/0031082 A1* | 2/2006 | Amaitis et al. | 705/1 |
| 2006/0083205 A1* | 4/2006 | Buddhikot et al. | 370/338 |
| 2006/0143111 A1* | 6/2006 | Mylet | 705/37 |
| 2006/0182169 A1 | 8/2006 | Belge et al. | |
| 2006/0218392 A1* | 9/2006 | Johnston | 713/156 |
| 2006/0234713 A1 | 10/2006 | Oswal et al. | |
| 2006/0262768 A1 | 11/2006 | Putzolu | |
| 2007/0106596 A1 | 5/2007 | Bayyapu et al. | |
| 2007/0274404 A1* | 11/2007 | Papandriopoulos et al. | 375/260 |
| 2008/0025243 A1* | 1/2008 | Corneille et al. | 370/313 |
| 2008/0052387 A1 | 2/2008 | Heinz et al. | |
| 2008/0108365 A1* | 5/2008 | Buddhikot et al. | 455/452.1 |
| 2008/0112361 A1* | 5/2008 | Wu | 370/330 |
| 2008/0151743 A1 | 6/2008 | Tong et al. | |
| 2008/0183634 A1 | 7/2008 | Sadler | |
| 2008/0186882 A1 | 8/2008 | Scherzer et al. | |
| 2008/0221951 A1* | 9/2008 | Stanforth et al. | 705/7 |
| 2008/0222019 A1* | 9/2008 | Stanforth et al. | 705/37 |
| 2008/0222021 A1* | 9/2008 | Stanforth et al. | 705/37 |
| 2009/0046625 A1* | 2/2009 | Diener et al. | 370/319 |
| 2009/0197627 A1 | 8/2009 | Kuffner et al. | |
| 2010/0056163 A1* | 3/2010 | Schmidt et al. | 455/446 |
| 2010/0142454 A1* | 6/2010 | Chang | 370/329 |
| 2010/0309806 A1* | 12/2010 | Wu et al. | 370/252 |
| 2011/0070838 A1* | 3/2011 | Caulfield | 455/62 |
| 2011/0149879 A1 | 6/2011 | Noriega et al. | |
| 2011/0164581 A1 | 7/2011 | Keon | |
| 2011/0237200 A1* | 9/2011 | Reunamaki et al. | 455/67.11 |
| 2012/0258753 A1* | 10/2012 | Stanforth et al. | 455/509 |
| 2013/0035108 A1* | 2/2013 | Joslyn et al. | 455/454 |

OTHER PUBLICATIONS

By the Commission, "Second Report and Order, Order on Reconsideration, and Second Further Notice of Proposed Rulemaking", Federal Communications Commission, 2004, FCC 04-167, pp. 1-180.

McKnight, Lee et al., "Best Effort versus Spectrum Markets: Wideband and Wi-Fi versus 3G MVNOs?", pp. 1-18.

Prabhu, Krish et al., "Time for Action" Genuine Ideas, 2002, [retrieved online Feb. 1, 2008], <http://www.genuineideas.com/ArticlesIndex/TimeForAction.htm>.

U.S. Spectrum Management Policy: Agenda for the Future, 1991.

Radio Spectrum Management, Module 5 of ICT Regulation Toolkit, ITU, 2007.

FCC 08-260, Second Report and Order and Memorandum Opinion and Order, Adopted Nov. 4, 2008 and Released Nov. 14, 2008.

"Digital Dividend: Cognitive Access, Consultation on License-Exempting Cognitive Devices using Interleaved Spectrum", Ofcom, Publication Date: Feb. 16, 2009.

International Search Report and Written Opinion dated Oct. 12, 2012 for corresponding application No. PCT/US12/47831.

* cited by examiner

SYSTEMS AND METHODS FOR PROVISIONING AND ALLOCATING A COMMODITIZED SPECTRUM OBJECT

RELATED APPLICATION DATA

The present application claims the benefit of U.S. Provisional Application Ser. Nos. 61/514,595 and 61/514,597, each of which was filed on Aug. 3, 2011, the disclosures of which are herein incorporated by reference in their entirety.

TECHNICAL FIELD OF THE INVENTION

The technology of the present disclosure relates generally to spectrum management, and more particularly, to systems and methods for provisioning and allocating a commoditized spectrum object.

BACKGROUND

Wireless networks and systems are becoming increasingly popular. Wireless communications, however, are constrained due to a limited amount of available, interference free spectrum that may be used for reliable communications within a geographic area.

To enhance the availability and reliability of interference free spectrum, procedures that are governed by regulatory agencies (e.g., the Federal Communications Commission (FCC) in the United States) have been developed for allocating and governing spectrum use. In the U.S., for example, the FCC licenses spectrum in a primary spectrum market to Commission licensees. A secondary market exists for the Commission licensees to sublease spectrum for use by other parties. An entity that seeks to transfer spectrum in the secondary market commonly is referred to as a "spectrum provider" or a "spectrum holder," and an entity or wireless communications system or device that has a need for spectrum to carry out wireless communications commonly is referred to as a "spectrum user." A spectrum provider or holder also may be a spectrum user.

In the U.S., some spectrum may be used without a license, but regulations on the spectrum may be imposed. For example, the FCC has implemented the elimination of analog television (TV) broadcasts in favor of digital TV broadcasts. This has freed up spectrum channels for use by unlicensed radio systems to offer various services, such as mobile communications and Internet access. This freed spectrum is commonly referred to as TV whitespace (TVWS), which is made up of the guard bands and unused TV channels between channel 2 and channel 51 (corresponding to 54 MHz to 698 MHz).

To avoid interference with digital TV broadcasts and other incumbent systems, such as wireless microphone systems, radios that use the TV whitespace are required to register and receive a channel map of available channels that may be used for the communications activity of the radio system. Current regulations require these radio systems to register every twenty-four hours. Also, for mobile radios, if the radio moves into a new location, a new registration is required. Other regulations on the radios are present, such as transmitted power limits for different types of radios. Additional information regarding the regulation of TV whitespace may be found in FCC 08-260, Second Report and Order and Memorandum Opinion and Order, Adopted Nov. 4, 2008 and Released Nov. 14, 2008, the entirety of which is incorporated herein by reference. Similar proposals have been made in places other than the United States. For example, Ofcom in the United Kingdom has described access to certain spectrum by cognitive radios in "Digital Dividend: Cognitive—Access Consultation on License-Exempting Cognitive Devices Using Interleaved Spectrum," published Feb. 16, 2009.

Conventional wireless networks use radios that transmit or receive communications within a fixed channel set or band. In some circumstances, radios are permitted to search among a predefined set of channels in a programmed way, as in trunked radio or cellular networks. The pool of available spectrum, however, is typically finite (or static), and radio channels and bandwidth are not optimized on an individual user or application basis. This leads to high inefficiencies in spectrum utilization, and since spectrum is a scarce resource, less than optimal performance for the user and network as a whole. To address such limitations, systems employing "cognitive networking" are being developed. Cognitive networking can be described as a method of wireless communication in which a network or a wireless node changes its transmission or reception parameters (e.g., the channel or bandwidth) to communicate, while avoiding interference with other users. This alteration of parameters is based on the active monitoring of several factors in the radio environment, such as user behavior and network conditions. In this manner, spectrum allocation is performed with an aim toward maximizing communication performance while minimizing interference among devices on the network.

A simple form of spectrum allocation is referred to in the art as direct spectrum allocation. Direct spectrum allocation is based upon a simple request for spectrum (in terms of frequency, location, and time for example). A specific implementation of this is the conventional allocation of TV white space. Requests are made directly by a radio (through an application programming interface (API) and via the internet) to a database controlled by a hosting entity that is a spectrum provider. The database and/or the radios conventionally are computer-implemented systems capable of storing software (programs, code, and/or logical instructions) and data on a computer readable medium (e.g., a memory), and capable of executing software for carrying out the software functions with a processor. In this manner, the database may include a channel allocation engine.

In simple direct spectrum allocation, allocations are made from a pool of available spectrum, for a specific location with no effort to avoid contention between radios or ensure hardware compatibility. In particular, an allocation engine resident in the host spectrum provider manages the spectrum database, and the allocation engine draws from the database and simply grants access to all available channels in accordance with a set of rules, such as those defined in the FCC's Second Report and Order and Memorandum Opinion and Order (FCC 08-260) on Unlicensed Operation in the TV Broadcast Bands. The grant is made in the form of a channel map provided by the allocation engine to the radio device. After a requesting radio receives a channel map of available spectrum, the final channel selection is made by the radio.

Direct spectrum allocation often is deficient because aside from spectrum availability, the channel map is not generated based on any parameters that relate to communication efficiency and interference issues. Accordingly, although a radio device may select any channel from the channel map, there is no guarantee that a selected channel will provide efficient, interference free use of the spectrum.

Direct spectrum allocation may be enhanced by implementing processes referred to in the art as "managed spectrum access". Managed spectrum access generally attempts to address the need to minimize congestion and interference among devices, while optimizing the quality of service. This can be accomplished by increasing the channel to allocation engine's knowledge of a radio's operating environment. For example, the allocation engine may consider information pertaining to the density of users on each channel, possible sources of interference, usage patterns and radio feedback, and the like. Because the spectrum allocation engine knows the location of registered radios, the location of possible interferers, the availability of alternate channels, and may have some feedback from the radio on real-time local radio frequency (RF) conditions, a weighted or ranked set of available channels (in order of predicted quality of service or preference the wireless communications application of the radio) can be derived for each radio by assessing the overall environment in which a radio managed by the engine is operating.

Managed spectrum access can further be enhanced by providing exclusive use channels to managed radios. In some instances, a usage fee may be imposed for exclusive use. Exclusive use channels would be offered by entering them into the available spectrum pool. One source of exclusive use channels might be broadcasters or spectrum holders (e.g., spectrum licensees) seeking to "rent" unused capacity.

One major distinction between managed spectrum access and simple direct spectrum allocation is that spectrum allocations in the managed spectrum access model are intended to be made for a finite geographic area, on a non-interfering basis. Managed spectrum access, therefore, strives to achieve physical separation among radios that operate on interfering channels, thus minimizing or eliminating the possibility of RF interference.

To allocate spectrum efficiently and on a non-interfering basis, spectrum should be described in terms that render spectrum tantamount to a fungible asset. In this manner, "chunks" of spectrum can be used, transferred, and otherwise manipulated as a commoditized object or entity. Conventionally, spectrum has been allocated principally in terms of area, time, and frequency. FIG. 1 is a schematic graph of blocks of conventional spectrum use rights that may be transferred from a corresponding spectrum holder to a spectrum user. The components that identify a block of spectrum include a time window, a frequency-based spectral mask, a geographic coverage area, and/or a transmitted power limit, which may be combined to form a spectrum commodity object 10. The graph of FIG. 1 schematically illustrates blocks of spectrum in three dimensions, including time, space (or geographic coverage area) and frequency. Each spectrum commodity object 10 also may have the associated transmitted power limit, which is a power value that radios operating in accordance with the transmitted power limit may not exceed. Each spectrum commodity object 10 may be associated with use rights that may be transferred from a corresponding spectrum holder to a spectrum user in the secondary market. The spectrum commodity object may have an associated monetary or non-monetary value, or may not be associated with a value.

However, improvements may be made to the allocation of spectrum principally based on area, time, and frequency.

SUMMARY

There is a need in the art for an improved system and methods for provisioning spectrum to generate a commoditized spectrum object, which has characteristics of a fungible asset. The provisioned spectrum object can then be transferred, traded, and generally allocated to user devices in the retail secondary spectrum market. The present disclosure describes an enhanced spectrum provisioning engine that provisions spectrum for allocation as part of a spectrum authorized shared access (ASA) platform. The spectrum provisioning engine embodies a system and methods for provisioning spectrum at the wholesale level as a commoditized spectrum object in a manner in accordance with network operator (or regulator) constraints so as to provide efficient, interference free spectrum usage. The commoditized spectrum object may then be allocated to spectrum users in a manner that permits efficient spectrum usage without interference among the various users.

A provisioning engine provisions spectrum into an allocable spectrum object. The provisioning engine includes an interface configured to receive inputs of available spectrum information and a plurality of provisioning parameters. The plurality of to provisioning parameters include at least one signal strength limit, and may include at least first and second signal strength limits that may be a boundary strength limit and an allocation strength limit based on a propagation model. A controller is configured to execute a spectrum provisioning application that is stored in a memory and, by execution of the spectrum provisioning application, the provisioning engine is configured to generate an allocable spectrum object in accordance with the provisioning parameters. Spectrum encompassed within the spectrum object is allocable by an allocation engine to spectrum users in accordance with the provisioning parameters.

An allocation engine then allocates spectrum encompassed within the provisioned spectrum object. The allocation engine includes a communication interface configured to receive prospective spectrum usage information from a spectrum user device, and to access the spectrum object information from a spectrum provider. A controller is configured to execute allocation logic that is stored in a memory and, by execution of the allocation logic, the allocation engine is configured to: identify a plurality of provisioning parameters of the spectrum object, wherein the plurality of provisioning parameters include at least one signal strength limit, compare the provisioning parameters to the prospective spectrum usage to determine whether the prospective spectrum usage is in compliance with the provisioning parameters, and allocate spectrum encompassed within the spectrum object for the spectrum usage when it is determined that the prospective spectrum usage is in compliance with the provisioning parameters.

Accordingly, an aspect of the invention is a provisioning engine for provisioning spectrum into an allocable spectrum object. In exemplary embodiments, the provisioning includes an interface configured to receive inputs of available spectrum information and a plurality of provisioning parameters, wherein the plurality of provisioning parameters include at least one signal strength limit. A controller is configured to execute a spectrum provisioning application that is stored in a memory. By execution of the spectrum provisioning application, the provisioning engine is configured to generate an allocable spectrum object in accordance with the provisioning parameters. A database stores the allocable spectrum object, and spectrum encompassed within the spectrum object is allocable by an allocation engine to spectrum users in accordance with the provisioning parameters.

In an exemplary embodiment of the provisioning engine, the provisioning engine further includes a database for storing the available spectrum information.

In an exemplary embodiment of the provisioning engine, the provisioning engine further includes a database for storing the provisioning parameters.

In an exemplary embodiment of the provisioning engine, the at least one signal strength limit includes a first signal strength limit and a second signal strength limit.

In an exemplary embodiment of the provisioning engine, the first strength limit is a boundary strength limit that is a signal strength limit at a boundary of a coverage area of the spectrum object, and the second strength limit is an allocation strength limit that is a strength limit calculated based on a propagation model relative to previously allocated spectrum within the spectrum object.

In an exemplary embodiment of the provisioning engine, the provisioning parameters include a frequency start and a frequency stop.

In an exemplary embodiment of the provisioning engine, the provisioning parameters further include a minimum spectrum block size, wherein the minimum spectrum block size is equal to or less than a difference between the frequency stop minus the frequency start.

In an exemplary embodiment of the provisioning engine, the difference between the frequency stop minus the frequency start is an integer multiple of the minimum spectrum block size.

In an exemplary embodiment of the provisioning engine, the provisioning parameters include a time start and a time end later than the time start.

In an exemplary embodiment of the provisioning engine, the provisioning parameters further include a maximum time reservation, wherein the maximum time reservation is equal to or shorter that than a difference between the time end minus the time start.

In an exemplary embodiment of the provisioning engine, the provisioning parameters further include a fixed radius coverage allocation parameter comprising, for a given spectrum usage type, a minimum distance to nearest allocated spectrum within the spectrum object.

In an exemplary embodiment of the provisioning engine, the provisioning parameters further include whether spectrum encompassed within the spectrum object is allocable for exclusive or non-exclusive spectrum usage.

In an exemplary embodiment of the provisioning engine, the provisioning parameters further include an enabler maximum power spectral density for an enabler device, and a dependent maximum power spectral density for a dependent device, wherein the dependent maximum power spectral density is less than the enabler maximum power spectral density.

In an exemplary embodiment of the provisioning engine, the provisioning parameters further include a notification interval comprising a time interval at which a user device will be in contact with the allocation engine.

In an exemplary embodiment of the provisioning engine, the provisioning parameters further include at least one of a maximum allowable height above average terrain, and a maximum allowable antenna height above ground level.

In an exemplary embodiment of the provisioning engine, the provisioning parameters further include at least one radio access technology.

Another aspect of the invention is an authorized shared access system for allocating available spectrum to spectrum users. In exemplary embodiments, the authorized shared access system includes the described provisioning engine, at least one network operator that inputs the available spectrum information and the plurality of provisioning parameters to the provisioning engine, and an allocation engine that allocates spectrum encompassed within the spectrum object generated by the provisioning engine to spectrum users in accordance with the provisioning parameters.

In an exemplary embodiment of the provisioning authorized shared access system, the authorized shared access system includes at least one spectrum provider. The spectrum provider has a provider provisioning interface that accesses the spectrum object and an allocation interface that communicates with the allocation engine, wherein the allocation engine allocates spectrum encompassed within the spectrum object accessed the spectrum provider to a spectrum user.

Another aspect of the invention is a method of provisioning spectrum into an allocable spectrum object. In exemplary embodiments, the method of provisioning spectrum includes the steps of receiving inputs via an interface of available spectrum information and a plurality of provisioning parameters, wherein the plurality of provisioning parameters include at least one signal strength limit, executing a spectrum provisioning application that is stored in a memory and, by executing the spectrum provisioning application, generating an allocable spectrum object in accordance with the provisioning parameters, and storing the allocable spectrum object in a database. Spectrum encompassed within the spectrum object is allocable by an allocation engine to spectrum users in accordance with the provisioning parameters.

In an exemplary embodiment of the method of provisioning spectrum, the at least one signal strength limit includes a first signal strength limit and a second signal strength limit.

In an exemplary embodiment of the method of provisioning spectrum, the first strength limit is a boundary strength limit that is a signal strength limit at a boundary of a coverage area of the spectrum object, and the second strength limit is an allocation strength limit that is a strength limit calculated based on a propagation model relative to previously allocated spectrum within the spectrum object.

Another aspect of the invention is an allocation engine for allocating spectrum encompassed within a spectrum object. In exemplary embodiments, the allocation engine includes a communication interface configured to receive prospective spectrum usage information from a spectrum user device, and to access spectrum object information from a spectrum provider. A controller is configured to execute allocation logic that is stored in a memory. By execution of the allocation logic, the allocation engine is configured to identify a plurality of provisioning parameters of the spectrum object, wherein the plurality of provisioning parameters include at least one signal strength limit, compare the provisioning parameters to the prospective spectrum usage to determine whether the prospective spectrum usage is in compliance with the provisioning parameters, and allocate spectrum encompassed within the spectrum object for the prospective spectrum usage when it is determined that the prospective spectrum usage is in compliance with the provisioning parameters.

In an exemplary embodiment of the allocation engine, the controller further executes the allocation logic to decline allocation of spectrum encompassed within the spectrum object for the prospective spectrum usage when it is determined the prospective spectrum usage is not in compliance with the provisioning parameters.

In an exemplary embodiment of the allocation engine, the controller further executes the allocation logic to modify the prospective spectrum usage to be in compliance with the provisioning parameters when the prospective spectrum usage is determined not to be in compliance with the provisioning parameters, and allocate spectrum encompassed within the spectrum object for the modified prospective spectrum usage.

In an exemplary embodiment of the allocation engine, the at least one signal strength limit includes a first signal strength limit and a second signal strength limit. The controller executes the allocation logic to determine a first distance to nearest to nearest interference value for the first strength limit, determine a second distance to nearest to nearest interference value for the second strength limit, determine whether at least one of the first or second strength limits results in signal interference based on the distance to nearest interference values, and when one of the first or second strength limits results in signal interference, select a lower of the first or second strength limits as a power limit for the allocated spectrum.

In an exemplary embodiment of the allocation engine, the controller further executes the allocation logic to, when it is determined that neither of the first or second strength limits results in signal interference, select a higher of the first or second strength limits as a power limit for the allocated spectrum.

In an exemplary embodiment of the allocation engine, the first strength limit is a boundary strength limit that is a signal strength limit at a boundary of a coverage area of the spectrum object, and the second strength limit is an allocation strength limit that is a strength limit calculated based on a propagation model relative to previously allocated spectrum within the spectrum object.

In an exemplary embodiment of the allocation engine, the first distance to nearest to nearest interference value is a distance to a nearest spectrum boundary, and the second distance to nearest to nearest interference value is a distance to nearest allocated spectrum within the spectrum object.

In an exemplary embodiment of the allocation engine, the provisioning parameters include a fixed radius provisioning parameter. The controller further executes the allocation logic to determine whether the prospective spectrum usage complies with the fixed radius provisioning parameter, determine whether the prospective spectrum usage complies with the signal strength limit, and allocate spectrum encompassed within the spectrum object for the prospective spectrum usage when it is determined that the prospective spectrum usage is in compliance with the fixed radius and signal strength provisioning parameters Another aspect of the invention is a method of allocating spectrum encompassed within a spectrum object, the method being implemented by an allocation engine. The method of allocating spectrum includes the steps of receiving via a communication interface prospective spectrum usage information from a spectrum user, accessing with the communication interface spectrum object information from a spectrum provider, and executing allocation logic with a controller. By such execution, the controller performs the steps of identifying a plurality of provisioning parameters of the spectrum object, wherein the plurality of provisioning parameters include at least one signal strength limit, comparing the provisioning parameters to the prospective spectrum usage to determine whether the prospective spectrum usage is in compliance with the provisioning parameter, and allocating spectrum encompassed within the spectrum object for the spectrum usage when it is determined that the prospective spectrum usage is in compliance with the provisioning parameters.

In an exemplary embodiment of the method of allocating spectrum, the method further includes executing the allocation logic to decline allocation of spectrum encompassed within the spectrum object for the spectrum usage when it is determined the prospective spectrum usage is not in compliance with the provisioning parameters.

In an exemplary embodiment of the method of allocating spectrum, the method further includes executing the allocation logic to perform the steps of modifying the prospective spectrum usage to be in compliance with the provisioning parameters when the prospective spectrum usage is determined not to be in compliance with the provisioning parameters, and allocating spectrum encompassed within the spectrum object for the modified prospective spectrum usage.

In an exemplary embodiment of the method of allocating spectrum, the at least one signal strength limit includes a first signal strength limit and a second signal strength limit. The method further includes executing the allocation logic to perform the steps of determining a first distance to nearest to nearest interference value for the first strength limit, determining a second distance to nearest to nearest interference value for the second strength limit, and determining whether at least one of the first or second strength limits results in signal interference based on the distance to nearest interference values. When one of the first or second strength limits results in signal interference, selecting a lower of the first or second strength limits as a power limit for the allocated spectrum.

In an exemplary embodiment of the method of allocating spectrum, the method further includes executing the allocation logic to perform the step of, when it is determined that neither of the first or second strength limits results in signal interference, selecting a higher of the first or second strength limits as a power limit for the allocated spectrum.

In an exemplary embodiment of the method of allocating spectrum, the first strength limit is a boundary strength limit that is a signal strength limit at a boundary of a coverage area of the spectrum object, and the second strength limit is an allocation strength limit that a strength limit calculated based on a propagation model relative to previously allocated spectrum within the spectrum object.

In an exemplary embodiment of the method of allocating spectrum, the first distance to nearest to nearest interference value is a distance to a nearest spectrum boundary, and the second distance to nearest to nearest interference value is a distance to nearest allocated spectrum within the spectrum object.

In an exemplary embodiment of the method of allocating spectrum, the provisioning parameters include a fixed radius provisioning parameter. The method further includes executing the allocation logic to perform the steps of determining whether the prospective spectrum usage complies with the fixed radius provisioning parameter, determining whether the prospective spectrum usage complies with the signal strength limit, and allocating spectrum encompassed within the spectrum object for the prospective spectrum usage when it is determined that the prospective spectrum usage is in compliance with the fixed radius and signal strength provisioning parameters.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Figure 1:
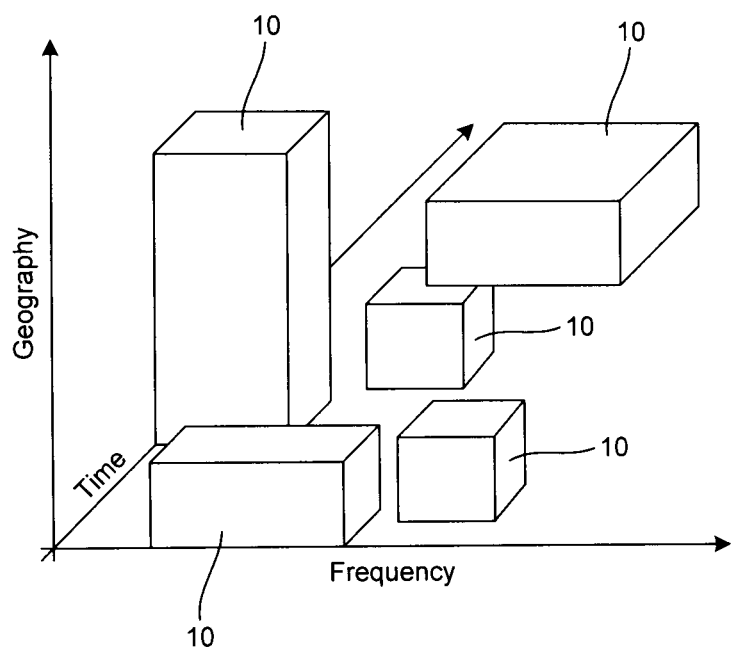
FIG. 1 is a schematic graph of blocks of spectrum use rights that may be transferred from a corresponding spectrum holder to a spectrum user.

Embodiments will now be described with reference to the drawings, wherein like reference numerals are used to refer to like elements throughout. It will be understood that the figures are not necessarily to scale.

It will be appreciated that aspects of the disclosed systems and methods are independent of the type or types of radio devices that may use spectrum. As such, the systems and methods may be applied in any operational context for wireless communications, and wireless communications are expressly intended to encompass unidirectional signal transmissions (e.g., broadcasting of a signal for receipt by a device without response), and to encompass bidirectional communications where devices engage in the exchange of signals. The methods and systems may be applied to licensed or unlicensed spectrum. Furthermore, the methods and systems are generic to modulation schemes, harmonic considerations, frequency bands or channels used by the radio devices, the type of data or information that is transmitted, how the radio devices use received information, and other similar communications considerations. Thus, the systems and methods have application in any suitable wireless communications environment.

Figure 2:
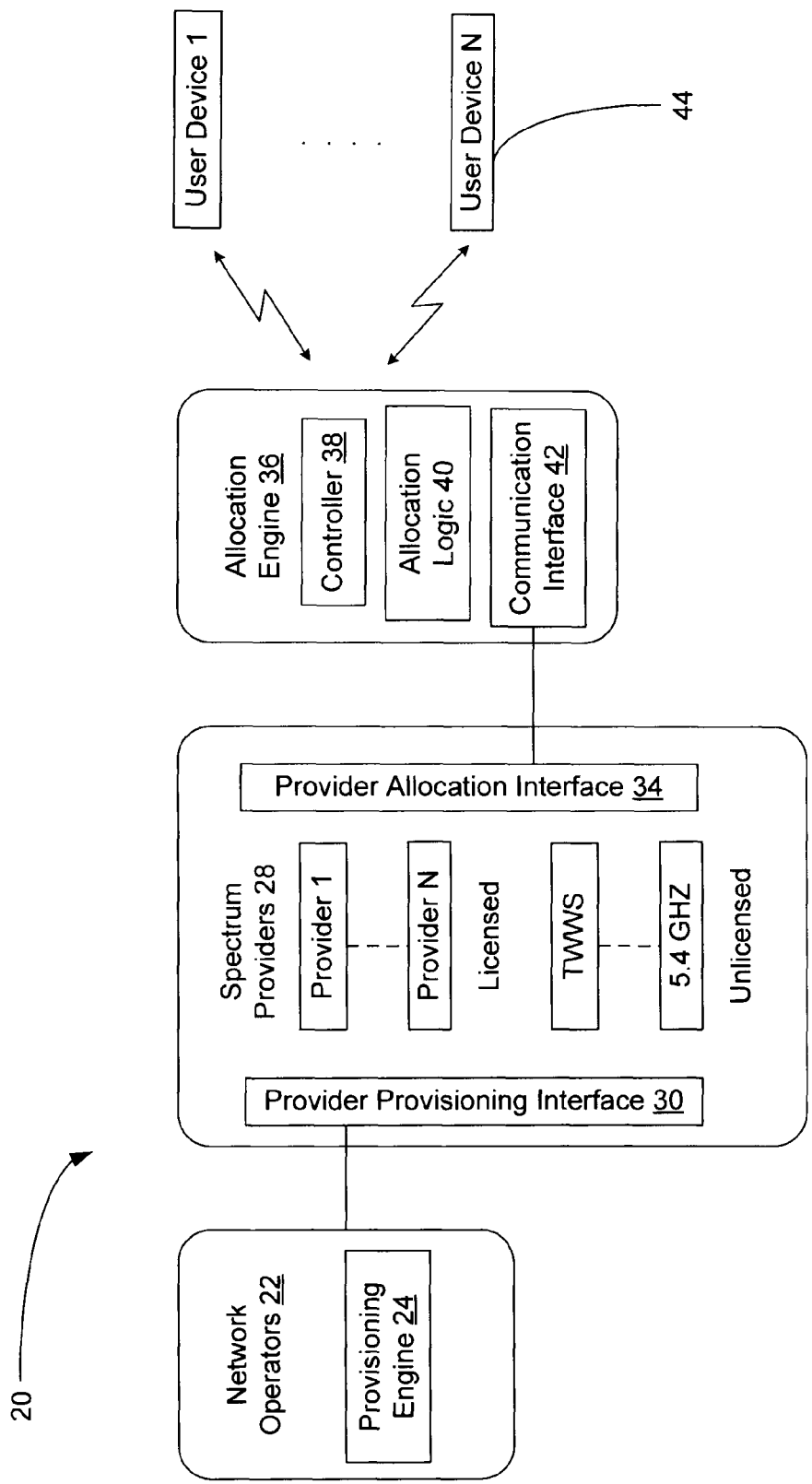
FIG. 2 is a schematic diagram depicting operative portions of an exemplary authorized shared access (ASA) system.

FIG. 2 is a schematic diagram depicting operative portions of an exemplary authorized shared access (ASA) system 20. The system includes one or more network operators 22. Generally, the network operators are entities that are spectrum holders that utilize the ASA system to offer spectrum, and typically may be large telecommunications companies that offer wireless networking services (e.g., AT&T, Verizon, and the like). The network operators can enter available spectrum into the ASA system for purposes of provisioning the available spectrum for spectrum providers, the provisioned spectrum then being allocated to end user devices as further explained below. Generally, the network operators provision spectrum by identifying a set of provisioning parameters and rules, which are used by the system during spectrum allocation such that the end user devices comply with the spectrum provisioning parameters.

Accordingly, the network operators may employ a spectrum provisioning engine 24 including a provisioning interface. The spectrum provisioning engine 24 provisions the spectrum as further explained below. Generally, the provisioning interface is employed by the network operators to enter spectrum into the ASA system and specify the various provisioning parameters that operate as constraints on using the provisioned spectrum. The provisioning parameters are described in detail below and may include coverage area (geographic boundaries), time (period of availability), frequency (start and end, or center frequency and bandwidth), and others. The provisioning parameters should include at least one signal strength limiting parameter that is utilized to substantially prevent interference among user devices operating within the provisioned spectrum, and substantially prevent interference with user devices operating across the coverage area boundaries of the provisioned spectrum. In exemplary embodiments, the provisioning parameters include a plurality of such signal strength limiting parameters. The provisioning parameters and constraints may be entered by the network operator via a conventional graphical user interface (GUI), or as a result of automated processing that determines available spectrum. Information regarding provisioned spectrum may then be obtained by spectrum providers 28 for allocation to spectrum user devices.

Referring again to FIG. 2, the ASA system 20 includes a plurality of spectrum providers 28. The spectrum providers 28 may obtain information regarding the provisioned spectrum via a provider provisioning interface 30. The spectrum providers in turn offer spectrum to end user devices through an allocation engine 36. The spectrum providers may be categorized based on the type of spectrum being provided or offered, although it will be appreciated that a given spectrum provider may provide multiple categories of spectrum. Broadly speaking, spectrum may be classified into three general categories of available spectrum. "Unlicensed spectrum," also referred to as "license-free spectrum," is spectrum for which spectrum users do not have to apply and pay a license fee to use this spectrum as long as it satisfies regulatory rules and requirements concerning spectrum use. TV white space and 2.4 GHz spectrum for WiFi are examples of spectrum that would fall within the category of unlicensed spectrum. Some countries, however, may require registration of each specific radio or link that uses the unlicensed spectrum.

"Licensed spectrum" includes bands of spectrum that are reserved for a specific use, or sold or leased to a specific spectrum user. For example, a governmental entity may reserve spectrum for military or public safety use, or may grant exclusive spectrum licensees to Commission licensees. The license grants the licensee an exclusive use of that spectrum for a specific use, thereby eliminating any interference issues with the parameters of the license. If a licensee subleases its spectrum to other entities in the secondary market, the licensee can set additional rules and requirements for the spectrum use within the original license.

"Licensed-exempt spectrum," which is also referred to as "lightly-licensed spectrum," such as the 3.65 GHz band in the U.S., is a hybrid of the other two types. A user or entity must register with the FCC and pay a nominal fee before using any equipment operating in the lightly-licensed band. Although registration is required, there is no grant of an exclusive right to use that frequency in any particular location. Spectrum uses among the various user devices must be considered to mitigate any potential interference issues. In addition, an entity might have to pay additional nominal fees for each high powered based station the spectrum user deploys.

The spectrum providers may include a provider allocation interface 34. The provider allocation interface 34 provides a link to the provisioned spectrum information by an allocation engine 36, as depicted in FIG. 2. The allocation engine 36, therefore, has a cooperating communication interface 42. This communication interface 42 is used by allocation engine 36 to gather provisioned spectrum information from the providers. The allocation engine can query more than one provider (e.g. TVWS, licensed) before making a spectrum offer to a spectrum user device. Interaction between provider entities and the allocation engine is through electronic software calls as are known in the art.

As depicted in FIG. 2, allocation engine 36 includes a controller 38 that executes allocation logic 40. The allocation engine receives a spectrum request from a spectrum user device 44 via the communication interface 42. After verifying device credentials, the allocation engine queries one or more spectrum providers and runs the allocation logic 40 to identify appropriate spectrum based on the response received from providers. The allocation engine in turn transmits an offer of spectrum to a user device 44. In other words, the communication interface 42 provides an interface over which a user device 44 may submit a request for wireless spectrum usage, and the allocation engine may transmit a spectrum allocation response to the request. It will be appreciated, therefore, that the allocation engine can generate offerings of spectrum based on the information obtained from the providers as to spectrum availability, and/or may generate an offering of such available spectrum in response to a spectrum request for spectrum by a user device. Interaction between the allocation engine 36 and user devices 44 typically is via electronic messaging as in known in the art. In addition, as referred to herein a user device or simply device is the end user of ASA system. Thus, the terms "spectrum user" and "device" or "user device" are used interchangeably. The user device sends spectrum requests to the ASA system including its capability and usage interests, which are then used by the allocation engine to make an offer of spectrum usage within the provisioned spectrum based on availability of the provisioned spectrum. The ASA system described herein may operate in conjunction with any suitable user devices.

As referenced above, the network operator(s) may employ a spectrum provisioning engine 24 including a provisioning interface to provision available spectrum. The provisioning engine of the ASA system permits the network operators to provision spectrum as a commoditized spectrum object, yielding the ability to match available spectrum with the exact needs of a radio device and in accordance with network operator (or regulator) constraints. The spectrum provisioning interface is used by network operators to enter their available spectrum. The available spectrum may be entered manually, or automatically as the system recognizes that free spectrum has become available. The available spectrum is then provisioned so as to be identified by a unique set of parameters and rules which are used by the allocation engine during spectrum allocation to end user devices. As is conventional (see again the example spectrum objects of FIG. 1), newly provisioned spectrum objects should not overlap in frequency, time, and geography with any of the existing provisioned spectrum objects. As further explained below, additional provisioning parameters are employed so as to more efficiency allocate the available spectrum while minimizing interference among the various spectrum users. Accordingly, a spectrum object, also referred to as a spectrum entity, defines a "chunk" of spectrum defined by the various provisioning parameters. The chunk of spectrum, as a commoditized item, is a fungible asset generated at the wholesale level that in turn can be allocated to one or more (and typically many) end user devices at the retail level.

Figure 3:
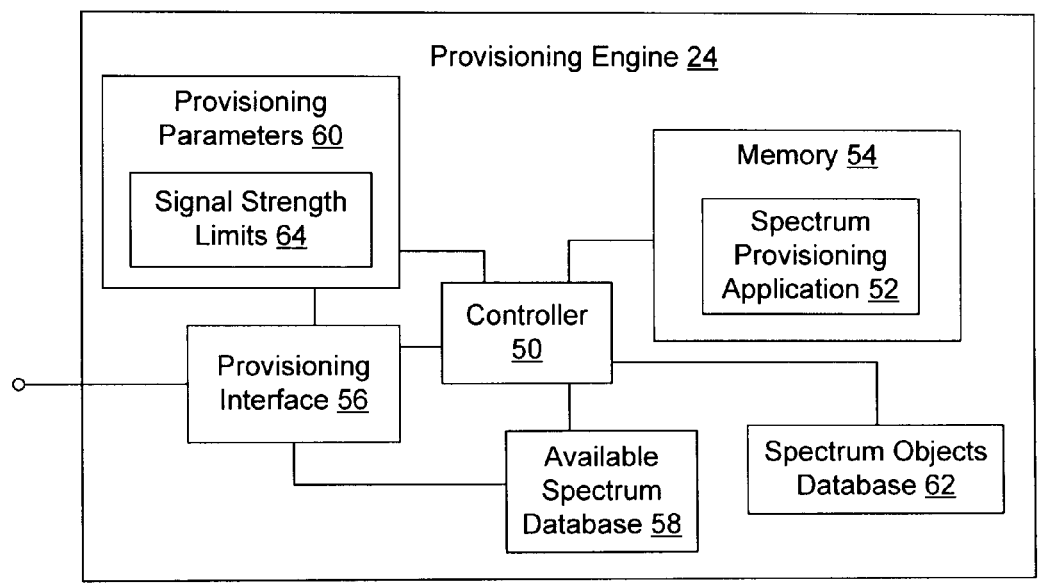
FIG. 3 is a schematic diagram depicting operative portions of an exemplary provisioning engine that may operate within the ASA of FIG. 2.

FIG. 3 is a schematic block diagram that depicts the operative portions of the provisioning engine 24. Generally, the provisioning engine provisions spectrum into an allocable spectrum object. The provisioning engine includes an interface configured to receive inputs of available spectrum information and a plurality of provisioning parameters. The plurality of provisioning parameters include at least one signal strength limit, and may include at least first and second signal strength limits that may be a boundary strength limit and an allocation strength limit. A controller is configured to execute a spectrum provisioning application that is stored in a memory and, by execution of the spectrum provisioning application, the provisioning engine is configured to generate an allocable spectrum object in accordance with the provisioning parameters. Spectrum encompassed within the spectrum object is allocable by an allocation engine to spectrum users in accordance with the provisioning parameters.

Referring to FIG. 3, the provisioning engine 24 may operate as a computer-based system capable of executing computer applications (e.g., software programs). The provisioning engine may include a controller or control circuit 50 that is configured to execute a spectrum provisioning application 52. The term "control circuit" or "controller" refers to any structural arrangement that implements a stated control function, and may include dedicated circuit components, firmware, and/or a processor that executes logical instructions. In exemplary embodiments, the spectrum provisioning application 52 is embodied as one or more computer programs (e.g., one or more software applications including compilations of executable code). The computer program(s) may be stored on a computer or machine readable medium 54, such as a magnetic, optical or electronic storage device (e.g., hard disk, optical disk, flash memory, etc.).

To execute the provisioning application 52, the controller 50 may include one or more processors used to execute instructions that carry out a specified logic routine(s). The computer readable medium 54, also referred to as a memory 54, may constitute a memory component for storing data, logic routine instructions, computer programs, files, operating system instructions, and the like. The memory 54 may comprise several devices, including volatile and non-volatile memory components. Accordingly, the memory 54 may include, for example, random access memory (RAM) for acting as system memory, read-only memory (ROM), hard disks, floppy disks, optical disks (e.g., CDs and DVDs), tapes, flash devices and/or other memory components, plus associated drives, players and/or readers for the memory devices. The controller or control circuit 50 and the components of the memory 54 may be coupled over a local interface, bus, and/or data structure, as is conventional for a computer based system.

The spectrum provisioning engine 24 further may include a provisioning interface 56. In exemplary embodiments, the provisioning interface 56 may be in the form of a graphical user interface (GUI), as is conventional of computer based systems. The provisioning interface may have various video and input/output (I/O) interfaces, as well related communication interfaces to support the I/O peripheral devices. The peripheral devices may include a display, a keyboard, a mouse, a microphone, a scanner, and so forth as may be conventional in computer GUIs. The provisioning interface 56 is configured to receive inputs from network operators of: (1) available spectrum information, and (2) a plurality of spectrum provisioning parameters. Inputs of the available spectrum information may be inputted via the GUI of the provisioning interface 56, processed by the controller 50, and, as depicted in the example of FIG. 3, stored in an available spectrum database 58. As referenced above, the available spectrum may be entered via the provisioning interface manually, or automatically as the system recognizes that free spectrum has become available. Similarly, inputs of the provisioning parameters may be inputted via the GUI of the provisioning interface 56, processed by the controller 50, and, as depicted in the example of FIG. 3, stored in a provisioning parameters database 60. It will be appreciated that the configuration of the storage of information in databases may be varied to any suitable configuration. For example, although depicted as separate components in the example of FIG. 3, the databases 58 and 60 may be incorporated into one or more of the memory devices that constitute the memory 54.

Generally, the controller executes the provisioning application 52, and in doing so initially reads the available spectrum information from the available spectrum database 58, and reads the provisioning parameters from the provisioning parameters database 60. In accordance with the provisioning parameters, the controller then generates an allocable provisioned spectrum object. Numerous allocable provisioned spectrum objects may be generated in this manner. The allocable provisioned spectrum objects may be stored in a spectrum objects database 62. As with the other databases, the spectrum objects database may be a separate database or incorporated into one or more of the memory devices that constitute the memory 54. The spectrum objects database may be accessed by the spectrum providers 28 over the provider provisioning interface 30 (see FIG. 2). In this manner, the spectrum offering of the spectrum providers, as implemented by the allocation engine, is based on the spectrum objects that have been generated by the spectrum provisioning engine 24.

Figure 4:
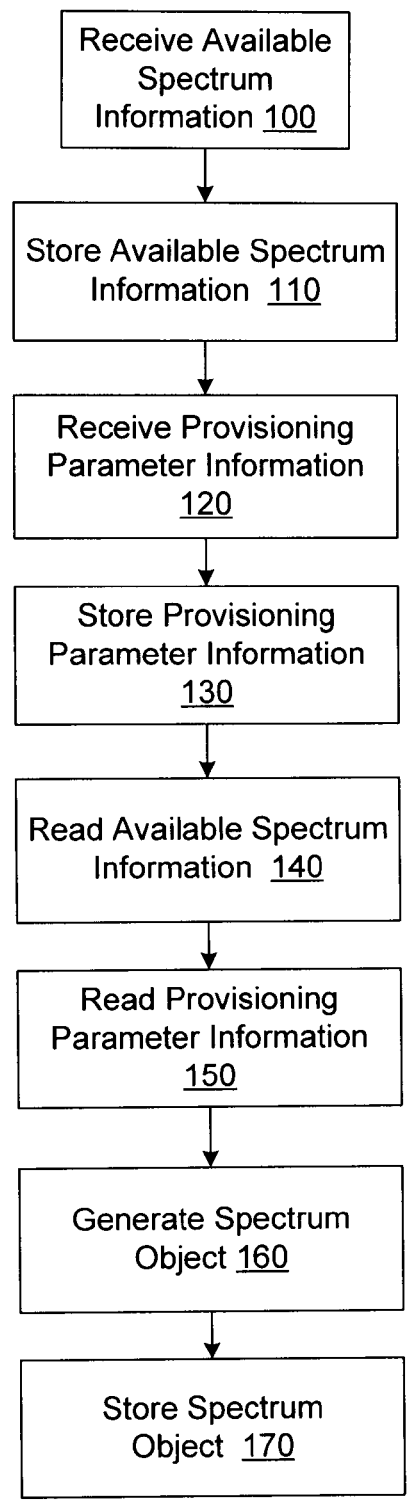
FIG. 4 is a flow-chart diagram depicting an exemplary method of provisioning spectrum.

In accordance with the above description, FIG. 4 depicts an overview of an exemplary method of provisioning spectrum into an allocable spectrum object. Although the exemplary method is described as a specific order of executing functional logic steps, the order of executing the steps may be changed relative to the order described. Also, two or more steps described in succession may be executed concurrently or with partial concurrence. It is understood that all such variations are within the scope of the present invention.

The method may begin at step 100, in which the provisioning engine receives inputs of available spectrum information provided by the network operator (manually or automatically) via the provisioning interface. At step 110, the available spectrum information may be stored in an available spectrum database. At step 120, the provisioning engine receives inputs of spectrum provisioning parameters provided by the network operator via the provisioning interface. At step 130 the spectrum provisioning parameters may be stored in a provisioning parameters database. The various steps of processing the received and stored inputs may be performed by the controller 50 executing the provisioning application 52 stored in the memory 54. At steps 140 and 150 respectively, the provisioning engine reads the available spectrum information and the provisioning parameters. At step 160, the provisioning engine generates an allocable spectrum object based on the available spectrum information and provisioning parameters. At step 170, the allocable spectrum object may be stored in a spectrum objects database.

In this manner, the provisioning engine generates a provisioned spectrum object, which is a commoditized, fungible asset of spectrum defined and delineated by the provisioning parameters. The provisioned spectrum object thus generated is in a form suitable for offering by the spectrum providers and allocated by the allocation engine among user devices that would seek to operate within the provisioned spectrum. As further described below, spectrum encompassed within the spectrum object is allocated by the allocation engine to spectrum users in accordance with the provisioning parameters.

Referring again to FIG. 3, the provisioning parameters include at least one signal strength limit 64, and may include a plurality of signal strength limits 64. In exemplary embodiments, the plurality of signal strength limits 64 may include at least a first signal strength limit and a second signal strength limit, which would be defined by the network operator over the provisioning interface by manual entry or automated processing. The first signal strength limit may be a boundary signal strength limit that specifies that any transmission within the provisioned spectrum should not exceed this signal strength limit outside the geographic boundary or coverage area of the provisioned spectrum. The second signal strength limit may be an allocation strength limit that defines a signal strength limit based on a distance from a device using previously allocated spectrum within the provisioned spectrum. The allocation strength limit is determined so as to limit interference with such previously allocated spectrum within the coverage area of the provisioned spectrum.

In one embodiment, the second or allocation strength limit may be determined as a signal strength limit based on a specific propagation model to limit interference with previously allocated spectrum within the coverage area of the provisioned spectrum. For example, each of the boundary signal strength limit and the allocation signal strength limit may be in the range of −100 to +100 dBuV/m. For an embodiment in which a Friis propagation model is utilized as the propagation model for the allocation signal strength limit, a Friis pass loss coefficient also is defined as part of determining the Friis signal strength limit. Other propagation models may be employed to determine the allocation strength limit, such as, but not limited to, F-curves and Longley-Rice propagation.

Although the provisioned spectrum objects should be defined by provisioning parameters that include at least one signal strength limit, and may include a plurality of signal strength limits, additional provisioning parameters may be employed to define the spectrum objects. The following description details various examples of potential provisioning parameters for defining the spectrum objects. It will be appreciated that the following description is not intended to be exhaustive. In addition, the provisioning parameters may be combined in any suitable manner, and not all of the spectrum objects will necessarily be defined by all of the potential provisioning parameters, nor have the same provisioning parameters.

Spectrum may be provisioned into spectrum objects based in part on frequency, geography, and time as had been performed conventionally. As further delineations of these parameters, the spectrum object may include a frequency start and a frequency stop that define the frequency range of the spectrum object. For example, the frequency start and frequency stop each may be a value within the range of 2 MHz to 100 GHz, with the frequency stop value being greater than the frequency start value.

Relatedly, a spectrum object may be delineated by a minimum spectrum block size to manage spectrum usage so that small blocks of non-allocated spectrum are avoided. For example, the minimum spectrum block size may be delineated as a minimum allowable bandwidth in MHz to a three decimal point precision, and be any bandwidth less than or equal to the frequency stop minus the frequency start. The network operator has the flexibility to specify the minimum size of spectrum chunks the operator wants to allocate within the provisioned spectrum object by setting such minimum spectrum block size parameter. Care, however, should be exercised to avoid an inappropriate value that can create spectrum chunks that will be unusable. For example, if a network operator provisions a spectrum with frequency range of 700-724 MHz with minimum spectrum block size of 5 MHz, the possible channels that can be allocated are [700-705], [705-

710], [710-715], [715-720] MHz. The remaining [720-724] MHz, although otherwise available, would not be allocated because it does not satisfy minimum spectrum block size parameter. To avoid such a portion of un-allocated spectrum, a more suitable minimum spectrum block size for this example would be 6 MHz, which will create four channels of [700-706], [706-712], [712-718], and [718-724] MHz. In this example, none of spectrum would need to remain un-allocated. In exemplary embodiments, therefore, the difference between the frequency stop minus the frequency start is an integer multiple (which may be one or greater) of the minimum spectrum block size. It is further noted that each block size need not be of the same bandwidth (which is the case in the above example), provided each given block size exceeds the minimum.

The provisioned spectrum object also may be defined in time between a time start and a time end later than the time start. The time start and end may be defined in any suitable format, such as, for example, a Zulu format with date and time to second precision. Relatedly, time may further be delineated by a maximum time reservation, which is the maximum amount of time the spectrum can be used by an end user device without requiring another request for spectrum from the user. For example, the maximum time reservation may be delineated in hours and would have a value equal to or smaller than the difference between the time end minus the time start. More specifically, the network operator can use maximum reservation length parameters to control how long a device can use the spectrum before sending another spectrum request. For example, a television white space (TVWS) provider can set this parameter to 24 hours. If a requested reservation start and end time is larger than the maximum reservation length, the allocation engine will cap the requesting device to the duration of the maximum reservation length associated with the spectrum offered to the device. This will force the device to send another spectrum request before the maximum reservation length is reached, and receive a confirmation that the spectrum is still available to the device, before the device can continue to use the spectrum.

The provisioned spectrum object further may be defined by a coverage area. The coverage area also may be delineated in any suitable format, such as for example by polygonal contours, geographic coordinates, or other suitable formats. As referenced above, a provisioning parameter may be an allocation signal strength limit based on a propagation model as to signals of allocated spectrum within the provisioned spectrum. An alternative method of allocating coverage area within the provisioned spectrum is by a fixed radius coverage allocation. For example, a fixed radius allocation may be defined by a number of meters from the nearest allocated spectrum of a given spectrum usage type. In one embodiment, the fixed radius may be 1000 meters for all allocated spectrum usages within the provisioned spectrum, although other values for the fixed radius may be employed.

The provisioned spectrum object further may be defined by whether spectrum encompassed within the spectrum object is allocable for exclusive or non-exclusive spectrum usage. The entirety of the provisioned spectrum may be designated for either exclusive use or non-exclusive use, or one or more portions of the provisioned spectrum may be made available for exclusive use while one or more other portions of the provisioned spectrum may be made available for non-exclusive use.

The provisioned spectrum object further may be defined by an enabler maximum power spectral density (PSD) and a dependent maximum PSD. As understood by those of ordinary skill in the art, an enabler device acts generally as a base station, hub, or access point to provide access to spectrum by one or more end user devices. Enabler devices thus tend to operate at a fixed location and at a particular PSD. Dependent devices are end user devices, insofar as a dependent device relies on the enabler device for access to spectrum. Dependent devices thus tend to be mobile devices that are wirelessly tethered to enabler devices for contacting the network. In the described system, the network operator has the flexibility to specify the maximum power spectral density that an enabler device and/or dependent devices can use within the provisioned spectrum. As dependent devices are not required to send an independent spectrum request, care must be taken when deciding the value of the dependent maximum PSD parameter relative to the enabler maximum PSD. For example, the dependent maximum PSD typically should be several decibels smaller than the enabler maximum PSD. In exemplary embodiments, the enabler maximum PSD and the dependent maximum PSD may range from −60 dBm to 90 dBm/100 KHz, again with the dependent maximum PSD being less than enabler maximum PSD. In such a system, if the network operator seeks to disable dependent device operation in the provisioned spectrum, the network operator may set the dependent maximum PSD to a substantially low value (e.g., 0 dBm/100 KHz). In addition, when a fixed radius coverage allocation method (referenced above) is utilized, the network operator should set the enabler maximum PSD and the dependent maximum PSD such that allocation of the spectrum does not interfere with allocation outside the fixed radius.

The provisioned spectrum object further may be defined by a notification interval, which is an interval at which an end user device will be in contact with the allocation engine. The notification interval may be any suitable unit of time, such as a value of minutes, and can depend on the type of spectrum usage. Through the notification interval, the system tracks reachability information of a device (e.g., IP address, port, etc.). The allocation engine uses this information to send a configuration message to a device on a requirement basis. For example, in a public safety band, a notification interval may be set to a relatively small value so that the allocation engine can quickly reach a device and instruct it to vacate the spectrum within a specified number of minutes (e.g., thirty minutes), if the spectrum is needed for emergency purposes.

The provisioned spectrum object further may be defined by parameters pertaining to antenna location and configuration. Such antenna-related parameters may include a maximum allowable antenna height above average terrain (HAAT), and/or a maximum allowable antenna height above ground level (AGL). The HAAT and AGL parameters may be a value in meters and would depend upon the radio type or spectrum usage type.

The provisioned spectrum object further may be defined by a set of Radio Access Technologies (RAT), designated by the network operator, which can use the spectrum. For example, some licensed spectrum might be dedicated to 4G (e.g., LTE, WiMax), while some licensed spectrum might be dedicated to 3G or WiFi usages. Other spectrum objects may be for any technology, including unlicensed television white space (TVWS). By provisioning the spectrum based on RAT technologies, the allocation engine can filter out devices that do not support the required RAT(s).

As stated above, it will be appreciated that the descriptions of the various potential provisioning parameters is not intended to be exhaustive. In addition, the provisioning parameters may be combined in any suitable manner, and not all of the spectrum objects will necessarily be defined by all of the potential provisioning parameters, nor have the same provisioning parameters.

By utilizing a variety of provisioning parameters to define a commoditized spectrum object for allocation, the described system improves over conventional configurations that had provisioned spectrum limitedly based on frequency, time, and coverage area in traditional spectrum brokering methods. The described system and related provisioning methods extend the description of a spectrum object or entity to include attributes that allow an allocation process to consider the specific needs of a network device and network operator constraints, which result in a more efficient spectrum allocation as compared to conventional configurations. For example, when the spectrum allocation engine is made aware of radio devices' transmitting power requirements and interference thresholds, as well as the constraints and flexibility offered by an available spectrum object, an efficient allocation will result. Allocation efficiency can be measured by allocation density, success rate of the allocated usages, and/or interference mitigation. Efficient allocations are obtained by determining a precise amount of reserved coverage area to ensure that a device has an adequate operating area, which does not cause interference with, or be interfered by, a nearby device. These calculations are performed in real-time by the allocation engine to provide enhanced allocation within the provisioned spectrum.

To perform the requisite calculation, each user device's transmit power requirements (watts) that may be normalized in terms of bandwidth (watts/hz) to determine a power spectral density. Correspondingly, the transmit power and interference thresholds of provisioned spectrum objects also may be described in similar terms (watts/hz or uV/hz). Accordingly, the power spectral density information is encapsulated within the provisioned spectrum object, so when spectrum is provisioned, these attributes can remain associated with the corresponding spectrum object(s). As spectrum objects are allocated to user devices, transmit power can be derived from the attributes provided in the spectrum object allocated to the device. This allows the spectrum allocation engine to remain hardware (radio type) agnostic and bandwidth agnostic, and yields flexibility to devices to adapt to any constraints levied by the spectrum allocation process.

Once available spectrum is provisioned into the spectrum object, therefore, the allocation engine 36 then allocates spectrum encompassed within the provisioned spectrum object. As referenced above, the allocation engine may include a communication interface 42, which is configured to receive prospective spectrum usage information from a spectrum user device 44, and to access spectrum object information from a spectrum provider 28. A controller 38 of the allocation engine is configured to execute allocation logic 40 that is stored in a memory, and, by execution of the allocation logic, the allocation engine is configured to: identify a plurality of provisioning parameters of the spectrum object, wherein the plurality of provisioning parameters include at least one signal strength limit, compare the provisioning parameters to the prospective spectrum usage to determine whether the prospective spectrum usage is in compliance with the provisioning parameter, and allocate spectrum encompassed within the spectrum object for the spectrum usage when it is determined that the prospective spectrum usage is in compliance with the provisioning parameters.

Figure 5:
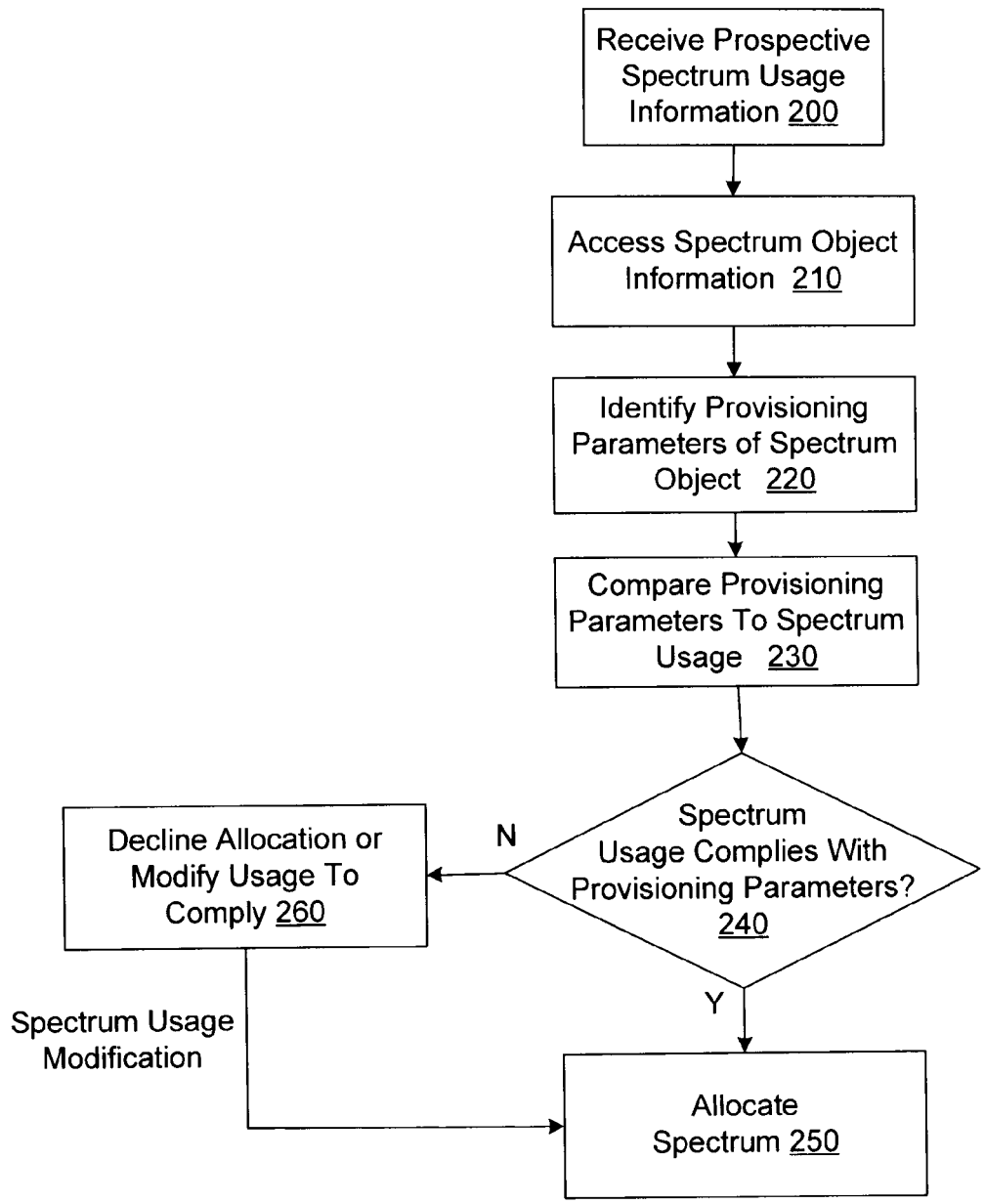
FIG. 5 is a flow-chart diagram depicting an overview of an exemplary method of allocating spectrum.

FIG. 5 is a flow-chart diagram that depicts an overview of an exemplary method of allocating spectrum. Although the exemplary method is described as a specific order of executing functional logic steps, the order of executing the steps may be changed relative to the order described. Also, two or more steps described in succession may be executed concurrently or with partial concurrence. It is understood that all such variations are within the scope of the present invention.

The method of allocating spectrum may begin at step 200 at which prospective spectrum usage information for a spectrum user is received. For example, the operation of the allocation engine may be initiated by a spectrum request submitted by a particular spectrum user, or as part of a spectrum offering of a provider. At step 210, the allocation engine accesses spectrum object information for the spectrum object that encompasses the prospective spectrum usage. The information attained by the above steps may be performed via the communication interface of the allocation engine. The processing of such information may be performed by the controller of the allocation engine executing the allocation logic. At step 220 the allocation engine identifies a plurality of provisioning parameters, which may include at least one signal strength limit. At step 230, the allocation engine compares the provisioning parameters to the prospective spectrum usage. At step 240, the allocation engine makes a determination as to whether the prospective spectrum usage complies with the provisioning parameters. If there is such compliance, at step 250 the spectrum encompassed within the spectrum object is allocated for the spectrum usage insofar as the prospective spectrum usage is in compliance with the provisioning parameters. If there is no such compliance, at step 260 the allocation may be declined insofar as the prospective spectrum usage is not in compliance with the provisioning parameters. Alternatively, the prospective spectrum usage may be modified at step 260 to be in compliance with the provisioning parameters. For example, the power limit and/or coverage area of the prospective spectrum usage may be limited or reduced. If such a modification is made, at step 250 the spectrum encompassed within the spectrum object is allocated for the modified prospective spectrum usage.

In an exemplary embodiment of the allocation process, as referenced above the provisioning parameters may include a plurality of signal strength limits, including at least a first signal strength limit and a second signal strength limit. The first signal strength limit may be a boundary signal strength limit that specifies that any transmission within the provisioned spectrum should not cross this signal strength limit outside the coverage area of the provisioned spectrum. The second signal strength limit may be an allocation signal strength limit that specifies the signal strength limit based on a propagation model to limit interference with previously allocated spectrum within the coverage are of the provisioned spectrum (e.g., a signal strength limit determined via a Friis propagation model). A more detailed example of the allocation of provisioned spectrum based on such signal strength limits as provisioning parameters is as follows.

Figure 6:
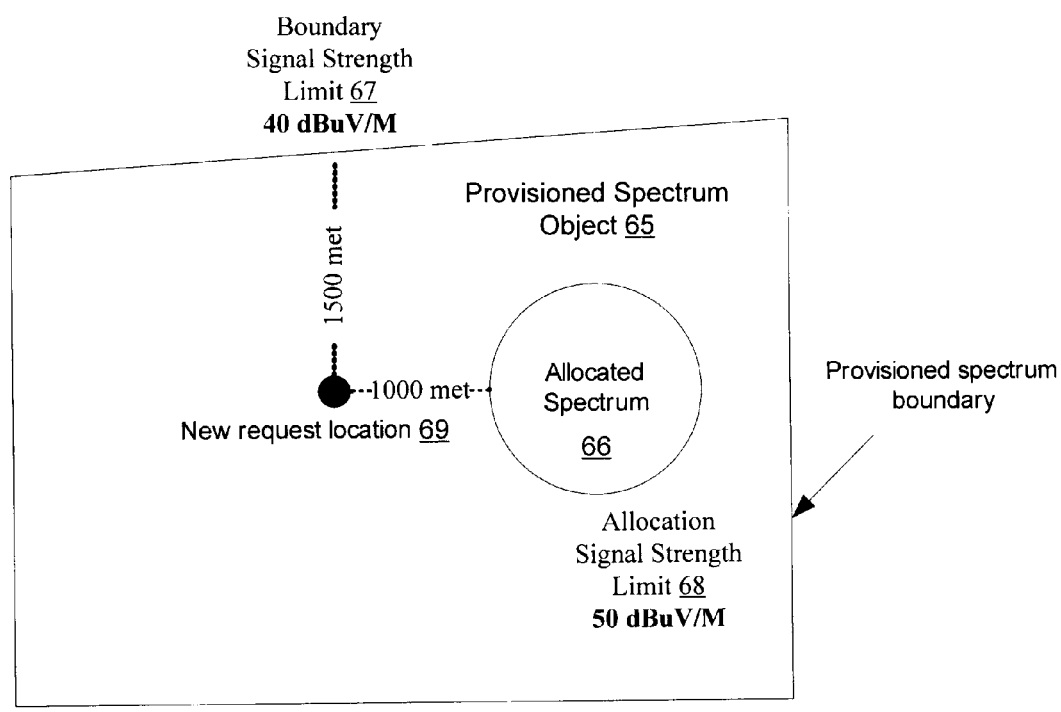
FIG. 6 is a schematic diagram depicting an example of allocating provisioned spectrum based on exemplary first and second signal strength limits as provisioning parameters.

FIG. 6 is a schematic diagram depicting an example of how the first and second signal strength limits may be employed to provision spectrum at the wholesale level, and allocate such provisioned spectrum at the retail level to end user devices. In the example of FIG. 6, the outer polygonal boundary represents the boundary of the coverage area of a provisioned spectrum object 65. In addition, a portion of the provisioned spectrum object already has been allocated, denoted as the allocated spectrum 66. The spectrum has been provisioned by the network operator based on the following provisioning parameters: (1) a first or boundary signal strength limit 67, which in this example is 40 dBuV/m, and (2) a second or allocation signal strength limit 68, which in this example is 50 dBuV/m. By having two different signal strength limits, the allocation engine can be more aggressive in allocating the spectrum inside the coverage area of the provisioned spectrum (e.g. based on the 50 dBuV/m allocation strength limit), and remain conservative near the boundary (e.g., based on the 40 dBuV/m boundary limit). To support the signal strength limits, the spectrum provisioning engine may generate two different distances to nearest interference values, one for a distance to the nearest spectrum boundary, and another for a distance to a nearest allocated spectrum. FIG. 6 illustrates the allocating of provisioned spectrum on such bases, where "met" refers to the distance in meters.

In the example of FIG. 6, there has been a user request for spectrum as indicated in the circle denoted as the "New request location" 69. The spectrum provider has determined that for the specific location of the spectrum request, the distance to a nearest boundary of the provisioned spectrum is 1500 meters (the first distance to nearest interference value), and the distance to the nearest allocated spectrum is 1000 meters (the second distance to nearest interference value). In addition, as referenced above in this example the provisioned boundary signal strength limit has been set to 40 dBuV/m, and the allocation signal strength limit has been set to 50 dBuV/m.

In an implementation that only supports the allocation signal strength, when a provider allocates spectrum within the spectrum object 65 in response to the request, the allocation engine will set the distance to nearest interference to 1000 meters. The allocation propagation model will use this distance, provisioned path loss exponent, and allocation signal strength limit to calculate allowed transmitting power. However, the distance to the boundary is only 1500 meters, and it is not likely that the signal strength will drop down by an additional 10 dB (50 db-40 db) in only five hundred meters. Accordingly, the allocation engine will determine that if the transmittal power for the requested spectrum were limited only by the allocation signal strength limit, the spectrum usage will violate the boundary strength limit specified in the provisioning parameters, and thus create an interference to neighboring spectrum outside the coverage area of the provisioned spectrum. To resolve this issue, the allocation engine determines two different power calculations, one based on the first boundary signal strength limit distance to the nearest boundary, and the other based on the second allocation signal strength limit to the distance to the nearest allocated spectrum. To prevent interference either across the provisioned spectrum boundary, or with other allocated spectrum within the provisioned spectrum boundary, the lesser of the two power calculations is selected to be the power limit for the allocated spectrum.

Figure 7:
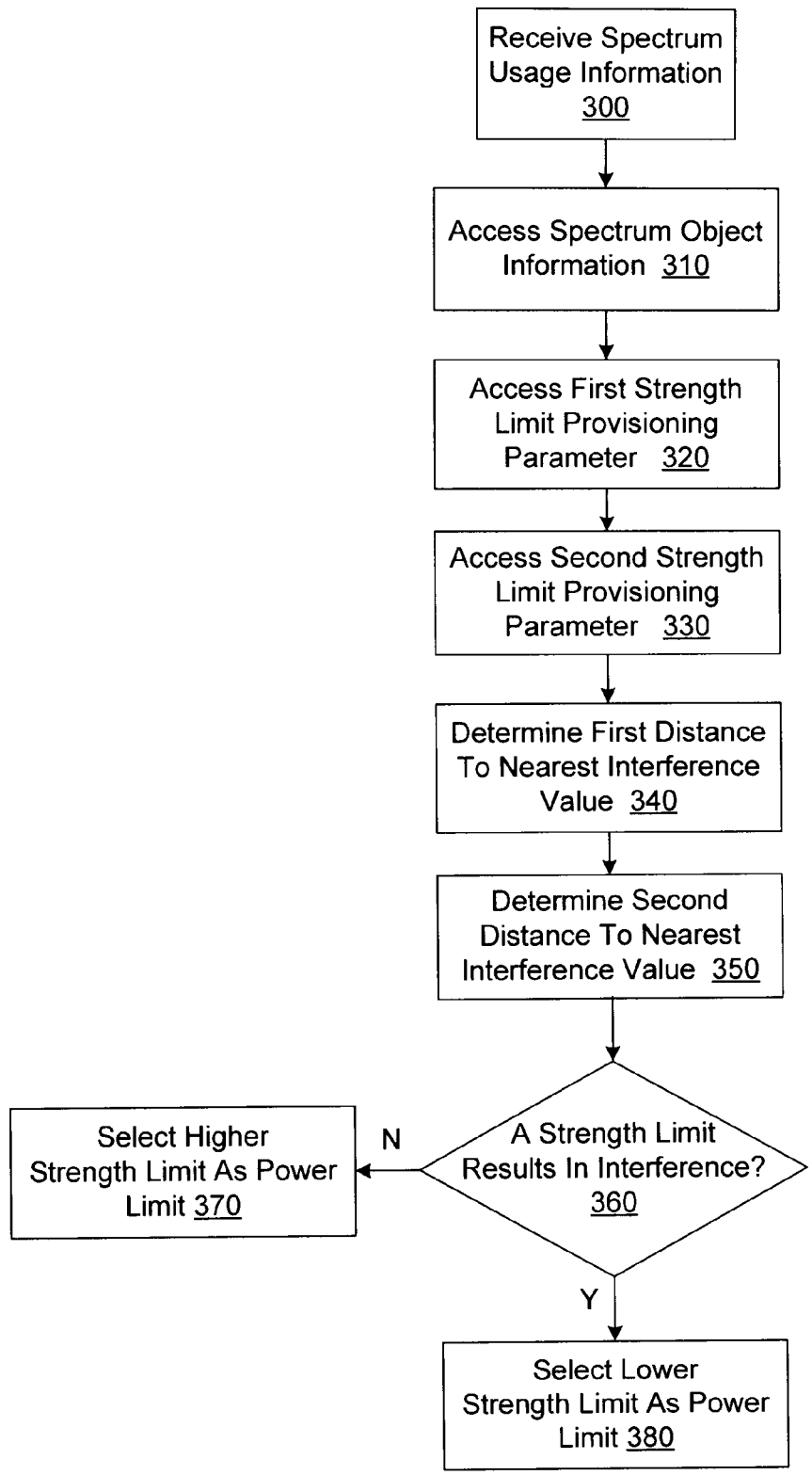
FIG. 7 is a flow-chart diagram depicting an exemplary method of allocating provisioned spectrum based on exemplary first and second signal strength limits as provisioning parameters.

In accordance with the above description, FIG. 7 is a flowchart diagram that depicts an exemplary method of allocating spectrum based on exemplary first and second signal strength limits as provisioning parameters. Although the exemplary method is described as a specific order of executing functional logic steps, the order of executing the steps may be changed relative to the order described. Also, two or more steps described in succession may be executed concurrently or with partial concurrence. It is understood that all such variations are within the scope of the present invention.

The method may begin at step 300, at which the allocation engine receives prospective spectrum usage information. For example, the operation of the allocation engine may be initiated by a spectrum request submitted by a particular spectrum user, or as part of a spectrum offering of a provider. At step 310, the allocation engine accesses spectrum object information for the spectrum object that encompasses the prospective spectrum usage. As above, the information attained by the above steps may be performed via the communication interface of the allocation engine. In addition, the processing of such information again may be performed by the controller of the allocation engine executing the allocation logic. At step 320 the allocation engine accesses a first strength limit provisioning parameter, and at step 330, the allocation engine accesses a second strength limit provisioning parameter. As described above, a network operator may designate or determine such first and second strength limit provisioning parameters as part of provisioning the spectrum. In exemplary embodiments, the first strength limiting provisioning parameter may be a boundary strength limit, and the second strength limiting provisioning parameter may be an allocation strength limit.

At step 340 the allocation engine may determine a first distance to nearest interference value for the first strength limit, and at step 350 the allocation engine may determine a second distance to nearest interference value for the second strength limit. If the first strength limit is a boundary strength limit, the first distance to nearest interference value is the distance from the location of the prospective spectrum usage to the nearest boundary. If the second strength limit is an allocation strength limit, the second distance to nearest interference value is the distance from the location of the prospective spectrum usage to the nearest allocated spectrum within the provisioned spectrum based on a suitable propagation model.

At step 360, the allocation engine determines whether one of either the first or second strength limits would result in interference in view of the first and second distance to interference values. If not ("No" at step 360), meaning that no interference would result for either strength limit, at step 370 the higher strength limit is selected as the power strength limit for the prospective spectrum usage. If, however, one of the strength limits would result in interference ("Yes at step 360), at step 380 the lower strength limit (i.e., the non-interfering strength limit) is selected as the power strength limit for the prospective spectrum usage. It will be appreciated, of course, that if both strength limits would result in interference, the prospective spectrum usage would not be allocated as requested, or could only be allocated with a reduced power limit to avoid interference (see again FIG. 5, step 260 modification).

As referenced above, as an alternative to utilizing an allocation strength limit, spectrum may be provisioned based on a fixed radius method of allocation. Again, under a fixed radius provisioning parameter, for a given spectrum usage type a prospective spectrum usage is deemed to be non-interfering if the location of such usage is at a distance equal to or greater than a fixed radius distance from the nearest allocated spectrum within the provisioned spectrum. The above processing of the second strength limit thus simplifies to a determination of whether the location of the prospective spectrum usage satisfies the fixed radius distance requirement of the provisioning parameters. In such case, if there would be no interference based on the boundary strength limit, the power limit for the prospective spectrum usage need not be limited based on interference issues. If, however, the fixed radius distance requirement is satisfied but the prospective spectrum usage otherwise would violate the boundary strength limit, the power limit for the prospective spectrum usage may be limited based on the boundary strength limit.

Figure 8:
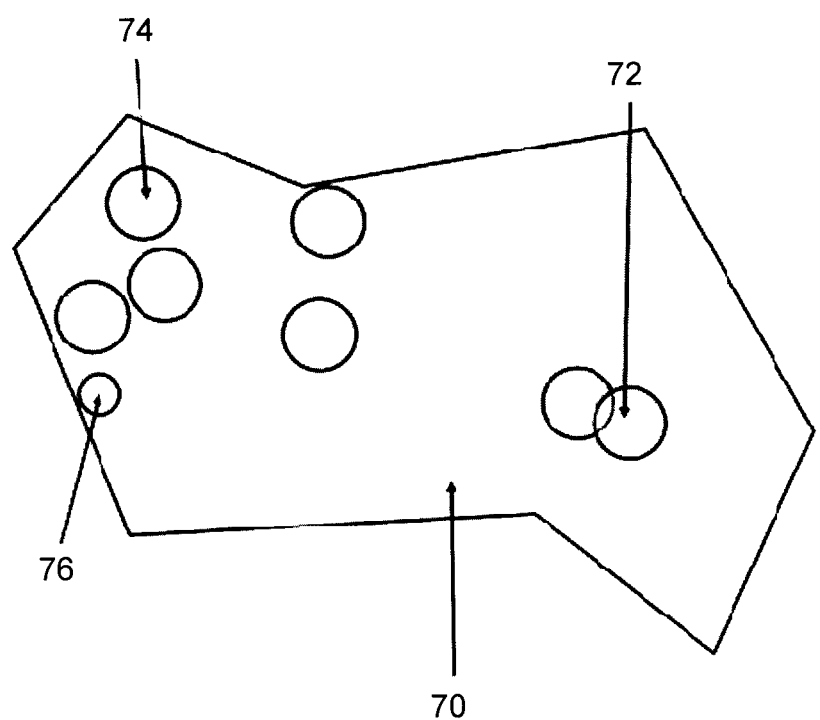
FIG. 8 is a schematic diagram depicting the retail allocation of spectrum within a wholesale spectrum object.

FIG. 8 is a schematic diagram that depicts the retail allocation of spectrum within a wholesale provisioned spectrum object 70 provisioned by a network operator in accordance with various provisioning parameters as described above. The provisioned spectrum object 70 may be allocated to various non-exclusive and exclusive user devices by automated processes of the allocation engine by the various mechanisms described herein.

For example, a portion of the provisioned spectrum object 70 may be allocated to non-exclusive spectrum usages 72, the non-exclusive usage being represented by the overlap of the circles representing the spectrum usage. Portions of the provisioned spectrum object 70 also may be allocated to exclusive spectrum usages 74, the exclusive use being represented by the non-overlap of such circles representing the spectrum usage. One of the exclusive usages 76 has a reduced transmit power limit due to a boundary condition at the edge of the spectrum object 70, as represented by the smaller size of the circle representing the spectrum usage 76.

Although certain embodiments have been shown and described, it is understood that equivalents and modifications falling within the scope of the appended claims will occur to others who are skilled in the art upon the reading and understanding of this specification.

What is claimed is:

1. A provisioning engine for provisioning spectrum into an allocable spectrum object, the provisioning engine comprising:
   an interface configured to receive inputs of available spectrum information and a plurality of provisioning parameters, wherein the plurality of provisioning parameters include at least one signal strength limit;
   a controller configured to execute a spectrum provisioning application that is stored in a memory and, by execution of the spectrum provisioning application, the provisioning engine is configured to generate an allocable spectrum object in accordance with the provisioning parameters; and
   a database that stores the allocable spectrum object;
   wherein spectrum encompassed within the spectrum object is allocable by an allocation engine to spectrum users in accordance with the provisioning parameters; and
   wherein the at least one signal strength limit includes a first signal strength limit and a second signal strength limit, the first strength limit is a boundary strength limit comprising a signal strength limit at a boundary of a coverage area of the spectrum object, and the second strength limit is an allocation strength limit comprising a strength limit calculated based on a propagation model relative to previously allocated spectrum within the spectrum object.

2. The provisioning engine of claim 1, further comprising a database for storing the available spectrum information.

3. The provisioning engine of claim 1, further comprising a database for storing the provisioning parameters.

4. The provisioning engine of claim 1, wherein the provisioning parameters include a frequency start and a frequency stop.

5. The provisioning engine of claim 4, wherein the provisioning parameters further include a minimum spectrum block size, wherein the minimum spectrum block size is equal to or less than a difference between the frequency stop minus the frequency start.

6. The provisioning engine of claim 5, wherein the difference between the frequency stop minus the frequency start is an integer multiple of the minimum spectrum block size.

7. The provisioning engine of claim 1, wherein the provisioning parameters include a time start and a time end later than the time start.

8. The provisioning engine of claim 7, wherein the provisioning parameters further include a maximum time reservation, wherein the maximum time reservation is equal to or shorter that than a difference between the time end minus the time start.

9. The provisioning engine of claim 1, wherein the provisioning parameters further include a fixed radius coverage allocation parameter comprising, for a given spectrum usage type, a minimum distance to nearest allocated spectrum within the spectrum object.

10. The provisioning engine of claim 1, wherein the provisioning parameters further include whether spectrum encompassed within the spectrum object is allocable for exclusive or non-exclusive spectrum usage.

11. The provisioning engine of claim 1, wherein the provisioning parameters further include an enabler maximum power spectral density for an enabler device, and a dependent maximum power spectral density for a dependent device, wherein the dependent maximum power spectral density is less than the enabler maximum power spectral density.

12. The provisioning engine of claim 1, wherein the provisioning parameters further include a notification interval comprising a time interval at which a user device will be in contact with the allocation engine.

13. The provisioning engine of claim 1, wherein the provisioning parameters further include at least one of a maximum allowable height above average terrain, and a maximum allowable antenna height above ground level.

14. The provisioning engine of claim 1, wherein the provisioning parameters further include at least one radio access technology.

15. An authorized shared access system for allocating available spectrum to spectrum users comprising:
   the provisioning engine of claim 1;
   at least one network operator that inputs the available spectrum information and the plurality of provisioning parameters to the provisioning engine; and
   an allocation engine that allocates spectrum encompassed within the spectrum object generated by the provisioning engine to spectrum users in accordance with the provisioning parameters.

16. The authorized shared access system of claim 15, further comprising at least one spectrum provider;
   wherein the spectrum provider has a provider provisioning interface that accesses the spectrum object and an allocation interface that communicates with the allocation engine, wherein the allocation engine allocates spectrum encompassed within the spectrum object accessed the spectrum provider to a spectrum user.

17. A method of provisioning spectrum into an allocable spectrum object comprising the steps of:
   receiving inputs via an interface of available spectrum information and a plurality of provisioning parameters, wherein the plurality of provisioning parameters include at least one signal strength limit;
   executing a spectrum provisioning application that is stored in a memory and, by executing the spectrum provisioning application, generating an allocable spectrum object in accordance with the provisioning parameters; and
   storing the allocable spectrum object in a database;
   wherein spectrum encompassed within the spectrum object is allocable by an allocation engine to spectrum users in accordance with the provisioning parameters; and
   wherein the at least one signal strength limit includes a first signal strength limit and a second signal strength limit, the first strength limit is a boundary strength limit comprising a signal strength limit at a boundary of a coverage area of the spectrum object, and the second strength limit is an allocation strength limit comprising a strength limit calculated based on a propagation model relative to previously allocated spectrum within the spectrum object.

18. An allocation engine for allocating spectrum encompassed within a spectrum object, the allocation engine comprising:
a communication interface configured to receive prospective spectrum usage information from a spectrum user device, and to access spectrum object information from a spectrum provider; and
a controller configured to execute allocation logic that is stored in a memory and, by execution of the allocation logic, the allocation engine is configured to:
identify a plurality of provisioning parameters of the spectrum object, wherein the plurality of provisioning parameters include at least one signal strength limit;
compare the provisioning parameters to the prospective spectrum usage to determine whether the prospective spectrum usage is in compliance with the provisioning parameters; and
allocate spectrum encompassed within the spectrum object for the prospective spectrum usage when it is determined that the prospective spectrum usage is in compliance with the provisioning parameters;
wherein the at least one signal strength limit includes a first signal strength limit and a second signal strength limit, and the controller further executes the allocation logic to:
determine a first distance to nearest to nearest interference value for the first strength limit;
determine a second distance to nearest to nearest interference value for the second strength limit;
determine whether at least one of the first or second strength limits results in signal interference based on the distance to nearest interference values; and
when one of the first or second strength limits results in signal interference, select a lower of the first or second strength limits as a power limit for the allocated spectrum.

19. The allocation engine of claim 18, wherein the controller further executes the allocation logic to decline allocation of spectrum encompassed within the spectrum object for the prospective spectrum usage when it is determined the prospective spectrum usage is not in compliance with the provisioning parameters.

20. The allocation engine of claim 18, wherein the controller further executes the allocation logic to:
modify the prospective spectrum usage to be in compliance with the provisioning parameters when the prospective spectrum usage is determined not to be in compliance with the provisioning parameters; and
allocate spectrum encompassed within the spectrum object for the modified prospective spectrum usage.

21. The allocation engine of claim 18, wherein the controller further executes the allocation logic to:
when it is determined that neither of the first or second strength limits results in signal interference, select a higher of the first or second strength limits as a power limit for the allocated spectrum.

22. The allocation engine of claim 21, wherein the first strength limit is a boundary strength limit comprising a signal strength limit at a boundary of a coverage area of the spectrum object, and the second strength limit is an allocation strength limit comprising a strength limit calculated based on a propagation model relative to previously allocated spectrum within the spectrum object.

23. The allocation engine of claim 22, wherein the first distance to nearest to nearest interference value is a distance to a nearest spectrum boundary; and
the second distance to nearest to nearest interference value is a distance to nearest allocated spectrum within the spectrum object.

24. The allocation engine of claim 18, wherein the provisioning parameters include a fixed radius provisioning parameter, and the controller further executes the allocation logic to:
determine whether the prospective spectrum usage complies with the fixed radius provisioning parameter;
determine whether the prospective spectrum usage complies with the signal strength limit; and
allocate spectrum encompassed within the spectrum object for the prospective spectrum usage when it is determined that the prospective spectrum usage is in compliance with the fixed radius and signal strength provisioning parameters.

25. A method of allocating spectrum encompassed within a spectrum object, the method being implemented by an allocation engine and comprising the steps of:
receiving via a communication interface prospective spectrum usage information from a spectrum user;
accessing with the communication interface spectrum object information from a spectrum provider; and
executing allocation logic with a controller to perform the steps of:
identifying a plurality of provisioning parameters of the spectrum object, wherein the plurality of provisioning parameters include at least one signal strength limit;
comparing the provisioning parameters to the prospective spectrum usage to determine whether the prospective spectrum usage is in compliance with the provisioning parameter; and
allocating spectrum encompassed within the spectrum object for the spectrum usage when it is determined that the prospective spectrum usage is in compliance with the provisioning parameters;
wherein the at least one signal strength limit includes a first signal strength limit and a second signal strength limit, and further comprising executing the allocation logic to perform the steps of:
determining a first distance to nearest to nearest interference value for the first strength limit;
determining a second distance to nearest to nearest interference value for the second strength limit; and
determining whether at least one of the first or second strength limits results in signal interference based on the distance to nearest interference values; and
when one of the first or second strength limits results in signal interference, selecting a lower of the first or second strength limits as a power limit for the allocated spectrum.

26. The method of allocating spectrum of claim 25, further comprising:
executing the allocation logic to decline allocation of spectrum encompassed within the spectrum object for the spectrum usage when it is determined the prospective spectrum usage is not in compliance with the provisioning parameters.

27. The method of allocating spectrum of claim 25, further comprising executing the allocation logic to perform the steps of:
modifying the prospective spectrum usage to be in compliance with the provisioning parameters when the prospective spectrum usage is determined not to be in compliance with the provisioning parameters; and allocating spectrum encompassed within the spectrum object for the modified prospective spectrum usage.

28. The method of allocating spectrum of claim 25, further comprising executing the allocation logic to perform the step of:

when it is determined that neither of the first or second strength limits results in signal interference, selecting a higher of the first or second strength limits as a power limit for the allocated spectrum.

29. The method of allocating spectrum of claim 28, wherein the first strength limit is a boundary strength limit comprising a signal strength limit at a boundary of a coverage area of the spectrum object, and the second strength limit is an allocation strength limit comprising a strength limit calculated based on a propagation model relative to previously allocated spectrum within the spectrum object.

30. The method of allocating spectrum of claim 29, wherein the first distance to nearest to nearest interference value is a distance to a nearest spectrum boundary; and
the second distance to nearest to nearest interference value is a distance to nearest allocated spectrum within the spectrum object.

31. The method of allocating spectrum of claim 25, wherein the provisioning parameters include a fixed radius provisioning parameter, and further comprising executing the allocation logic to perform the steps of:

determining whether the prospective spectrum usage complies with the fixed radius provisioning parameter;

determining whether the prospective spectrum usage complies with the signal strength limit; and allocating spectrum encompassed within the spectrum object for the prospective spectrum usage when it is determined that the prospective spectrum usage is in compliance with the fixed radius and signal strength provisioning parameters.

* * * * *